Patented Mar. 6, 1923.

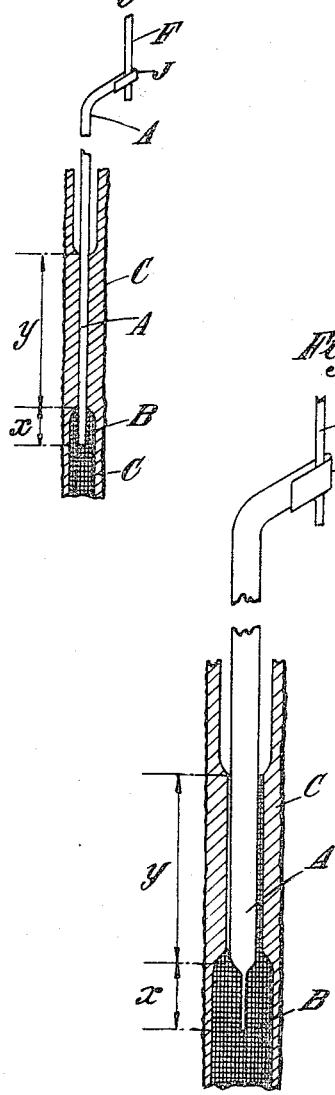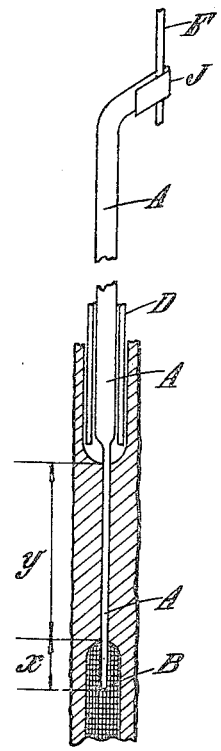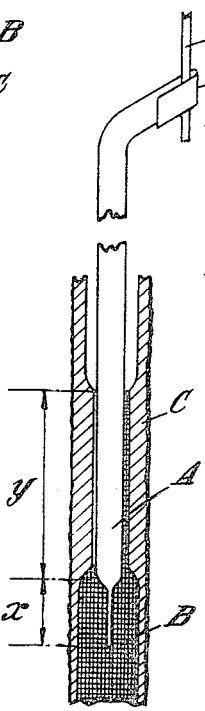

1,447,481

UNITED STATES PATENT OFFICE.

HAROLD MORRIS-AIREY AND GEORGE SHEARING, OF PORTSMOUTH, AND STANLEY ROBERT MULLARD, OF SOUTHFIELDS, LONDON, ENGLAND.

THERMIONIC VALVE.

Application filed August 22, 1921. Serial No. 494,274.

*To all whom it may concern:*

Be it known that we, HAROLD MORRIS-AIREY and GEORGE SHEARING, both residents of H. M. Signal School, Royal Naval Barracks, Portsmouth, in the county of Hants, England, and STANLEY ROBERT MULLARD, of 71 Standen Road, Southfields, London, England, all subjects of the King of Great Britain, have invented certain new and useful Improvements in and Relating to Thermionic Valves (for which we have filed an application in England July 10th, 1920), of which the following is a specification.

This invention relates to thermionic valves and consists in an improved construction for thermionic valves specially applicable to those having a silica envelope and more particularly to the conductor to the electrode and seal of such a valve.

The invention is illustrated by way of example in the drawing accompanying this specification, in which Figure 1 shows a known method of sealing a conductor to an electrode in a thermionic valve having a silica envelope. Fig. 2 shows a method of sealing according to the present invention, and Fig. 3 shows a modified method of sealing according to the present invention.

In Fig. 1 the seal B is made by the use of lead which when molten is run into position between the conductor A and the silica tube C. The conductor A has a uniform diameter along its length. For a length indicated by $x$ this conductor A is sealed into the lead B and for a length $y$ it is sealed into the silica tube C to avoid the possibility of the lead forming the seal, when molten, passing into the interior of the valve.

The maximum permissible current which can be carried by such a seal is limited for the following reasons:—

(a) The heat generated by the electrode F and the other valve electrode must not be sufficient to heat the conductor A at the junction J of the electrode with the conductor and adjacent to this junction to such a temperature that the electrode is not securely held at the joint J and the conductor A loses its rigidity.

(b) The diameter of the conductor A along the length $y$ where it is sealed into the silica tube is limited to avoid the possibility of cracking the silica tube by unequal expansion with heat.

In Figure 2 is shown an improved construction of conductor and seal for silica valves in accordance with this invention. The portion $x$ of the conductor A in this figure is preferably of the same diameter as the conductor A shown in Fig. 1, whilst the portion $y$ thereof is increased in diameter for the remainder of its length. A silica covering tube D may be used over the conductor A as shown. By this construction the following advantages are obtained:—

(a) No overheating of the conductor occurs at the junction J of the conductor A with the electrodes F which overheating may impair the contact at junction J.

(b) A very rigid support of the electrode F is obtained.

(c) Increased current carrying capacity for a given seal is obtained for (i) the heating of the length $y$ of the conductor A is reduced by reason of the proximity of the larger diameter of this conductor, (ii) the increased heating of the conductor A adjacent to the electrode F caused by the increase of current is more than counter-balanced by the increased cross section of A.

In Figure 3 is shown another form of improved construction in accordance with this invention. In this figure the conductor A has its diameter reduced only along the length $x$ of the lead seal B. For the length $y$ the conductor A is normally at air temperatures and is an easy fit in the silica bore sufficient to permit of the expansion of the conductor A with temperature without cracking the silica tube C.

These constructions of conductor for a valve electrode and seal for a silica valve as shown in Figures 2 and 3 are more particularly applicable to the seal and conductor for the filament of such a valve.

Having thus described our invention what we claim as new and desire to secure by Letters Patent is:—

1. A conductor and seal for a thermionic valve comprising a conductor with a portion of reduced diameter, a silica tube, a lead seal in said tube, the portion of reduced diameter extending into the lead seal.

2. A conductor and seal for a thermionic valve comprising a conductor with a portion of reduced diameter, a silica tube, a lead seal in said tube, the portion of reduced diameter extending into the lead, and a second silica tube surrounding a portion of the conductor beyond the reduced portion thereof.

3. A conductor and seal for a thermionic valve comprising a conductor with a portion of reduced diameter, a silica tube, a metal seal in one end of said tube, said conductor being constructed to enable an increased current to be carried by a single conductor through the solid metal seal, as compared with the maximum current which could be carried by a single conductor of uniform diameter.

HAROLD MORRIS-AIREY.
GEORGE SHEARING.
STANLEY ROBERT MULLARD.